(12) United States Patent
Voss

(10) Patent No.: US 7,552,480 B1
(45) Date of Patent: Jun. 23, 2009

(54) METHOD AND SYSTEM OF ASSESSING RISK USING A ONE-DIMENSIONAL RISK ASSESSMENT MODEL

(75) Inventor: Timothy Voss, Darien, CT (US)

(73) Assignee: Citibank, N.A., New York, NY (US)

( * ) Notice: Subject to any disclaimer, the term of this patent is extended or adjusted under 35 U.S.C. 154(b) by 1051 days.

(21) Appl. No.: 10/421,521

(22) Filed: Apr. 23, 2003

Related U.S. Application Data

(60) Provisional application No. 60/374,666, filed on Apr. 23, 2002.

(51) Int. Cl.
*G06F 21/00* (2006.01)
*H04L 9/00* (2006.01)
*G06K 9/00* (2006.01)

(52) U.S. Cl. .............................. 726/25; 726/2; 713/150; 380/277

(58) Field of Classification Search ...................... 726/2; 713/150; 380/277
See application file for complete search history.

(56) References Cited

U.S. PATENT DOCUMENTS

| | | | | |
|---|---|---|---|---|
| 6,223,143 | B1 * | 4/2001 | Weinstock et al. | 703/17 |
| 6,895,383 | B2 * | 5/2005 | Heinrich | 705/7 |
| 7,305,351 | B1 * | 12/2007 | Bechhofer et al. | 705/7 |
| 7,319,971 | B2 * | 1/2008 | Abrahams et al. | 705/7 |
| 2003/0046128 | A1 * | 3/2003 | Heinrich | 705/7 |
| 2005/0004863 | A1 * | 1/2005 | Havrilak | 705/38 |

OTHER PUBLICATIONS

"Information Security Risk Assessment: Practices of Leading Organizations," U.S. General Accounting Office, Nov., 1999, 50 pp., http://www.gao.gov/special.pubs/ai00033.pdf.

"Guideline for the Analysis of Local Area Network Security" [online], National Institute of Standards and Technology, FIPS PUB 191, Nov. 9, 1994 [retrieved on Feb. 17, 2009], 28 pp., http://www.itl.nist.gov/fipspubs/fip191.htm.

Cohen F., "Managing Network Security: Balancing Risk" [online], Dec. 1998 [retrieved on Feb. 17, 2009], 5 pp., http://all.net/journal/netsec/1998-12.html.

Moore, A. P. Ellison, R. J., and Linger, R. C., "Attack Modeling for Information Security and Survivability" Mar., 2001, 31 pp., http://www.cert.org/archive/pdf/01tn001.pdf.

(Continued)

*Primary Examiner*—Nasser G Moazzami
*Assistant Examiner*—Chinwendu C Okoronkwo
(74) *Attorney, Agent, or Firm*—George T. Marcou; King & Spalding LLP

(57) ABSTRACT

A quantitative model combines a one-dimensional risk-assessment approach with expert knowledge to enable calculation of a probability or likelihood of exploitation of a threat to an information system asset without referring to actuarial information. A numerical value is established for one or more threats of attack on the information system asset based on expert knowledge without reference to actuarial data, and likewise, based on expert knowledge without reference to actuarial data, a numerical value is established for each of one or more access and privilege components of one or more vulnerabilities to attack on the information system asset. A security risk level for the information system asset is computed based upon the numerical values for threat and the access and privilege components for vulnerability so established.

19 Claims, 6 Drawing Sheets

| Impact $$$ | Threat | Vulnerability | |
|---|---|---|---|
| | | Access | Privilege |
| | 10 Casual users | 10 WAN/Internet | 10 Super-user |
| | 9.5 Kiddy scriptors | | 8 Security Administrator |
| | 9 Hackers | 8 Wireless | |
| | 6 Disgruntled Employees | 6 X.25/DecNet | 7.5 Super-user Read |
| | 7 Legitimate Consumers | | 7 Security Auditor |
| | 4.5 Competitors | 5 Terminal | 5 Normal users |
| | 4 Political Activists | | 4 Others |
| | 2 Organized Crimes | 1 Physical | 1 Nobody/Guest |
| | 1.2 Legal Enforcement | | |
| | 1 Government Agencies | | |

OTHER PUBLICATIONS

Soo Hoo, Kevin J., "How Much is Enough? A Risk-Management Approach to Computer Security," Stanford University, Jun., 2000, 99 pp., http://cisac.stanford.edu.docs/soohoo.pdf.

Katzke, Stuart W., "A Framework for Computer Security Risk Management," *The Analysis, Communication, and Perception of Risk*, Edited by B. J. Garrick and W. C. Gekler, Plenum Press, New York, pp. 361-374, 1991.

National Institute of Standards and Technology, "Guideline for Automatic Data Processing Risk Analysis," *FIPS PUBS 65*, Federal Information Processing Standards Publication, 27 pp., Aug. 1, 1979.

* cited by examiner

| Impact $$$ | Threat | Vulnerability ||
| --- | --- | --- | --- |
| | | Access | Privilege |
| | 10 Casual users | 10 WAN/Internet | 10 Super-user |
| | 9.5 Kiddy scriptors | | 8 Security Administrator |
| | 9 Hackers | 8 Wireless | |
| | 6 Disgruntled Employees | 6 X.25/DecNet | 7.5 Super-user Read |
| | 7 Legitimate Consumers | | 7 Security Auditor |
| | 4.5 Competitors | 5 Terminal | 5 Normal users |
| | 4 Political Activists | 1 Physical | 4 Others |
| | 2 Organized Crimes | | 1 Nobody/Guest |
| | 1.2 Legal Enforcement | | |
| | 1 Government Agencies | | |

Fig. 1

| |
|---|
| Compare the security risk level calculated for the information system asset to a security risk level calculated for a second information system asset |
| AND/OR |
| Initiate remediation if the security risk level calculated for the information system asset exceeds a pre-established security risk level threshold limit |
| AND/OR |
| Initiate remediation within a pre-established time limit if the security risk level calculated for the information system asset exceeds a pre-established security risk level threshold limit |
| AND/OR |
| Calculate a financial value of a security risk to the entity from attack on the information system asset based on a pre-established financial impact on the entity from attack on the information system asset and the security risk level calculated for the information system |

Fig. 4

Compare the total numerical value of security risk calculated for the information system asset to a total value of security risk calculated for a second information system asset

AND/OR

Initiate remediation if the total numerical value of security risk calculated for the information system asset exceeds a pre-established numerical value for an aggregate security risk threshold limit

Fig. 6

METHOD AND SYSTEM OF ASSESSING RISK USING A ONE-DIMENSIONAL RISK ASSESSMENT MODEL

PRIORITY APPLICATION

This application claims the benefit of U.S. Provisional Application No. 60/374,666 filed Apr. 23, 2002 and entitled "Method and System for Assessing Risk Using a One-Dimensional Risk Assessment Model", incorporated herein by this reference.

FIELD OF THE INVENTION

The present invention relates generally to the field of information system security, and more particularly to a method and system for assessing and quantifying the risk exposure of an information system or application using a one-dimensional quantitative risk assessment model.

BACKGROUND OF THE INVENTION

Risk assessments are often conducted to evaluate the risk to which a company is exposed when a security gap or vulnerability of an information system or an application cannot be mitigated. Unfortunately, there is no consistent methodology within risk assessments to precisely define vulnerabilities and hence quantify the risk. Likewise, there are insufficient actuarial statistics to determine the likelihood of exploitation of a vulnerability. Traditionally, in an ethical hacking or penetration testing process, probabilities or risks associated with each issue are labeled high, medium, or low. In attempting to assess the exposure to risk, for example, from a security gap of an information technology system, these high, medium, and low risk labels have been applied to risks in a qualitative approach. Many vulnerability alerting programs also use this qualitative or a simplified quantitative-range approach.

A problem with that approach is that it is extremely difficult to compare a high, medium, or low risk for one particular area with a high, medium or low risk in another area. It is not clear whether ethical hacking vendors or individual security professionals use the same criteria to determine risk. As a result, businesses are required to determine, for example, what is actually a high, medium, or low risk issue to the particular business and to resolve those issues. Further, no vendor or risk assessment mechanism has addressed risk aggregation. For example, the aggregation of a number of low risk issues may become a medium or high risk issue to the system as a whole and may therefore deserve greater attention.

Risk can be assessed in qualitative or quantitative terms, or in one dimensional or multidimensional terms, or in some combination of those terms. Quantitative approaches are often associated with measuring risk in terms of dollar losses, and qualitative approaches are often associated with measuring risk in terms of quality as indicated through a scale or ranking. One-dimensional approaches consider only limited components, such as risk equals magnitude of loss times frequency of loss. Multidimensional approaches consider additional components in the risk measurement such as reliability, safety, or performance.

A goal of risk assessment has always been to try to arrive at a quantitative number around risks. In many different industries, this is possible through the use of actuarial information. In the insurance business, for example, it can be determined on an actuarial basis how many houses are burnt down per year within a given number of houses, and the risks involved can be viewed around that actuarial determination. However, within the information technology security world, this kind of information is not available, for example, because companies simply do not publish such information. Another reason for its unavailability is that the area of information technology is evolving rapidly, and the types of threats and vulnerabilities that information technology security people face are always changing and new ones being discovered.

The earliest proposal for a quantitative approach for assessing computer-related risk was based on a metric: Annual Loss Expectancy (ALE).

$$ALE = \Sigma I(O_i) F_i,$$

Where:
$O_i$=Harmful Outcome I;
$I(O_i)$=Impact of Outcome i in Dollars; and
$F_i$=Frequency of Outcome i.

A consensus framework for computer risk management also emerged for adaptation to qualitative or quantitative risk assessment. Similar to other quantitative risk assessment approaches, the common framework required an assessment of security requirements, assets for consideration, security concerns, possible threats, vulnerabilities, and safeguards. The common framework and other ALE-based approaches created an assessment task of infeasible proportions. As a result, such approaches failed to gain widespread acceptance. Subsequently, in order to address issues of ALE-based approaches, a decision analytic framework was proposed to manage risk based on the risk management decision that incorporates probability theory to capture, clarify and convey uncertainly. However, a systematic collection of supporting data was still required to improve the risk model.

One attempt to address a quantitative assessment of information technology security risks involved, for example, putting systems on the Internet and determining the amount of time it takes for the systems to be compromised and how they are broken into. By putting different systems on the Internet, one can measure how each system is compromised by the amount of time. From that, one should be able to derive some likelihood for compromise of similar systems being placed on the Internet. A limitation of that approach is that it is valid only for Internet-type threats and does not take into account internal users of, or physical access to, information technology systems and the like. Further, it shows only the likelihood of one possible vulnerability that has been exploited by someone on the Internet, and it does not relate to any other vulnerabilities of the information technology system. Such an approach gives a high water mark vulnerability but reveals nothing about any other vulnerabilities, so it cannot be determined if there is any change through time. Additionally, the particular approach gives no indication of what would happen if the single vulnerability issue were mitigated.

Another approach, known as a vulnerability tree, attempts to look, for example, at all the possible coding errors within an information technology system and whether they could actually result in the exploitation of a vulnerability. This is an extremely tedious process that takes an extraordinary amount of time and is valid for only a single operating system at a time. It becomes invalid with any small changes, so it is not cost effective to use in a complex environment. Further, the process would likely take many years to complete. Such a process can be characterized as a heuristic approach and is a very high order approach that is impractical in a business environment.

Others have tried to approach assessment of information technology security risks from an historical perspective. In that approach, people are encouraged to document any hacks or compromises that they have previously experienced in order to attempt to derive statistics from such experiences. A problem with that approach is that the environment in which information technology systems operate is constantly changing. In the insurance business, the rate at which houses burn is relatively stable, and slight changes that occur over time can easily be taken into account. However, in the information technology industry, changes can occur on a weekly, monthly, or annual basis very rapidly. Therefore, the historical perspective type of approach is not suitable for assessing information technology security risks

SUMMARY OF THE INVENTION

It is a feature and advantage of the present invention to provide a method and system for assessing and quantifying the risk exposure of an information system or application using a one-dimensional quantitative risk assessment model having applicability in several areas including, for example, assessment and policy enforcement.

It is also a feature and advantage of the present invention to provide a method and system for assessing and quantifying the risk exposure of an information system or application using a one-dimensional quantitative risk assessment model that can produce business and security risk assessments in relative scales with a quantitative justification.

It is another feature and advantage of the present invention to provide a method and system for assessing and quantifying the risk exposure of an information system or application using a one-dimensional quantitative risk assessment model that can assist in defining enforcement policy for remedial actions.

It is an additional feature and advantage of the present invention to provide a method and system for assessing and quantifying the risk exposure of an information system or application using a one-dimensional quantitative risk assessment model that can contain the total risk level within a tolerable range.

It is a further feature and advantage of the present invention to provide a method and system for assessing and quantifying the risk exposure of an information system or application using a one-dimensional quantitative risk assessment model that can be used in conjunction with product revenue information to compare the risk versus revenue ratios of different products or businesses.

It is a still another feature and advantage of the present invention to provide a method and system for assessing and quantifying the risk exposure of an information system or application using a one-dimensional quantitative risk assessment model that can be used to determine the information security component of operational risk.

It is an additional feature and advantage of the present invention to provide a method and system for assessing and quantifying the risk exposure of an information system or application using a one-dimensional quantitative risk assessment model that enables comparing the return on investment for different risk mitigation controls or technologies.

It is a further feature and advantage of the present invention to provide a method and system for assessing and quantifying the risk exposure of an information system or application using a one-dimensional quantitative risk assessment model that can be used to determine relative levels of appropriate insurance.

To achieve the stated and other features, advantages and objects, the method and system for an embodiment of the present invention provides a new quantitative model combining a one-dimensional risk-assessment approach with expert knowledge that enables calculation of the probability or likelihood of a threat or exploitation occurring without referring to actuarial information. In calculating the likelihood of exploitation, an embodiment of the present invention employs strict definitions of "threat", "vulnerability", "exploit" and "criticality" to avoid confusion and makes use of expert knowledge to populate threat and vulnerability from a security point of view. An embodiment of the present invention makes use, for example, of computer software and hardware and one or more algorithms and tables. In an embodiment of the invention, a numerical value is established for one or more threats of attack on an information system asset of the entity based on expert knowledge without reference to actuarial data. Likewise, based on expert knowledge without reference to actuarial data, a numerical value is established for each of one or more access and privilege components of one or more vulnerabilities to attack on the information system asset. Based upon the numerical values for threat and the access and privilege components for vulnerability so established, a security risk level for the information system asset can be computed.

An aspect of establishing the numerical value for the threat of attack involves establishing the potential for an attack on the information system asset by a threat agent based, for example, on a combination of motivation and ability of the threat agent for the attack. Possible threat agents can be identified by either or both of a business manager or an information security officer for the entity and include, for example, casual users, kiddy scriptors, hackers, disgruntled employees, legitimate consumers, competitors, political activists, agents of organized crime, law enforcement agents, or government agents. An aspect of establishing the numerical value for the access component of the vulnerability to attack involves, for example, identifying one or more modes of access required for an attack on the information system asset by the threat agent and/or one or more methods of attack available to the threat agent. Possible modes of access can be identified by either or both of an information security officer or a technician for the entity and include, for example, wide area network access, global network access, wireless access, proprietary network access, packet switched network access, terminal access, or physical access. An aspect of establishing the numerical value for the privilege component of the vulnerability to attack involves, for example, identifying one or more unauthorized privileges that can be acquired by a threat agent from attack on the information system asset. Possible unauthorized privileges can likewise be identified by either or both of an information security officer or a technician for the entity and include, for example, super user privileges, security administrator privileges, super user read privileges, security auditor privileges, normal user privileges, or guest privileges.

The security risk level for the information system asset is calculated as the product of the numerical value of the threat of attack times the numerical value for the access component of the vulnerability to attack times the numerical value for the privilege component of the vulnerability to attack on the information system asset. The security risk level so calculated can be used, for example, for comparison to a security risk level calculated for another information system asset. Further, a numerical value for a security risk level threshold limit for the information system asset can be established and a security policy implemented which mandates that if the security risk level calculated for the information system asset exceeds the prescribed security risk level threshold limit, remediation shall be initiated. In addition, a time limit for initiating remediation can be established and a security policy implemented which mandates that if the security risk level calculated for the information system asset exceeds the security risk level threshold limit, remediation shall be initiated within the prescribed time limit. The security risk level can also be used, for example, to calculate a financial value of the security risk to the entity from attack on the information system asset. In this aspect, a monetary value of a financial impact on the entity of attack on the information system asset is established at least partly by self-assessment of the criticality in terms, for example, of confidentiality, integrity and availability, of the information system asset to the entity. The financial impact on the entity can be established, for example, at least partly by a business manager for the entity. The financial value of the security risk to the entity from attack on the information system asset is calculated based on the financial impact on the entity and the security risk level calculated for the information system.

An important aspect of the invention involves assessing and quantifying an aggregate risk exposure of one or more information system assets of an entity using the one-dimensional quantitative risk assessment model. In this aspect, a numerical value is established for each of a number of threats of attack on the information system asset of the entity based on expert knowledge without reference to actuarial data. Likewise, a numerical value is established for one or more access components and one or more privilege components of each of a number of vulnerabilities to attack on the information system asset also based on expert knowledge without reference to actuarial data. Based on the numerical value for each threat of attack on the information system asset and the numerical values for the access and privilege components of each vulnerability to attack on the information system asset, a number of security risk levels can be calculated for the information system asset and aggregated to determine a total numerical value of security risk for the information system asset. This total numerical value of security risk for the information system asset can be compared, for example, to a total numerical value of security risk calculated for another information system asset. Further, a numerical value can be established for an aggregate security risk threshold limit for the information system asset and a security policy implemented which mandates that if the total numerical value of security risk calculated for the information system asset exceeds the aggregate security risk threshold limit, remediation shall be initiated.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 1 is a table that illustrates an example of suggested scores for threat, access, and privilege for an embodiment of the invention;

FIG. 4 is a table that illustrates examples of uses for the security risk level quantified for the information system asset according to an embodiment of the present invention;

FIG. 6 is a table that illustrates examples of uses for the total numerical value of security risk quantified for the information system asset according to an embodiment of the present invention.

DETAILED DESCRIPTION

Figure 2:
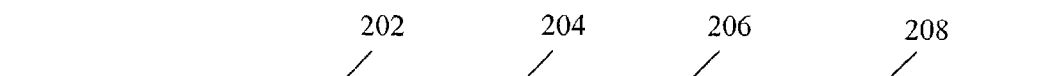
FIG. 2 is a table that illustrates an example of security incident response time based on exploitation likelihood and tiers for an embodiment of the present invention.

Referring now in detail to an embodiment of the present invention, an example of which is illustrated in the accompanying drawings, the present invention provides a method and system for assessing and quantifying the risk exposure of an information system or application using a one-dimensional quantitative risk assessment model. In particular, the present invention aids companies in conducting information technology security-related risk assessments. To strike a balance between model simplicity and faithful replication of the modeled system, the present invention provides a novel quantitative model combining a one-dimensional risk-assessment approach with expert knowledge to avoid collecting the data of threat and vulnerability and to achieve certain objectives. Thus, the present invention enables the calculation of probabilities or the likelihood of a threat occurring or exploitation without necessarily referring to actuarial information.

The present invention provides a mechanism for quantifying or putting numbers around risks so that comparisons can be drawn, and the return on the investment of different security mitigation controls can be considered. Further, an aspect of the present invention provides a way to measure the effectiveness of security controls and gives vendors a common language to use in informing their customers of vulnerabilities. In an embodiment of the invention, a one-dimensional quantitative approach for calculating the risk associated with a threat/vulnerability can be represented as follows: Risk equals loss incurred times likelihood of exploitation for a specific vulnerability. To calculate the likelihood of exploitation, other quantitative approaches require an immense assessment on threat and vulnerability. However, the model of the present invention uses expert knowledge to populate threat and vulnerability from a security point of view. This model is developed to assess risk on a per-vulnerability basis, and achieves a number of objectives, such as justifying existing risk assessment systems, maintaining a consistent risk labeling among different vendors, at least marking risk in priority, and aggregating risk to lead to policy enforcement for risk confinement or reduction.

An aspect of the present invention involves the application of expert knowledge to describe vulnerabilities and threats and concludes from that the relative likelihood of a vulnerability being exploited. A simile to this aspect, for example, is to ask someone how many times a coin would land on heads if the coin were tossed 100 times. The answer given would probably be 50 times. If an experiment were conducted, the actual number may be anywhere between, say 48 and 52, but 50 is a pretty good number. An individual who comes up with that number is not looking at actual historical data but has given a guess based upon expert knowledge. The coin simile is a similar sort of approach to that of the present invention, which defines more accurately what a risk is and what the attributes of risks are; asks experts to describe new vulnerabilities and new threats; comes up with numbers for risks; and allows a number of different things to be done in measuring and aggregating risks and looking at what effect different mitigation controls will have on that number.

In describing the model for calculating risk according to an embodiment of the present invention, "threat", "vulnerability", "exploit" and "criticality" are defined terms. "Threat" or adversarial resource denotes an entity's potential to attack. The "potential" aspect is a combination of the entity's motivation and ability. Needless to say, this is the most developed area of risk management. Most law enforcement agencies have definitions and ratings of threats. Examples of threats include casual observer, kiddy scriptors/hackers, disgruntled employees, political activists, competitors, organized crime, law enforcement agencies, government agencies and governments. The description is weighted towards the resources that the threat agent can bring to bear. Users of the model of the present invention should take into account the threat's motivation, numbers, capital and intellectual resource. Large corporations can assume they are targets of choice and not chance, thus simplifying the decisions.

"Vulnerability" represents sensitivity to attack, which can be assessed in terms of the access required to exploit the vulnerability and the additional privilege that a successful exploitation grants the attacking entity. For example, a buffer overflow in the IP stack (access) results in the attacking entity acquiring a root account (system privileges). Some accesses are local, requiring keyboard or mouse access, whereas others can be triggered remotely. Similarly, some vulnerabilities give limited privileges and thus may result in limited changes to the system, hence information under attack. "Exploit" means a threat's method of attacking a vulnerability, such as Code Red or Nimda. It is worth remembering here that many vulnerabilities that are hard to exploit now become easier with time. Some vulnerabilities which get posted do not have any written exploits, so the lower order threats cannot use them. This means that the actual risk remains low. "Criticality" denotes the importance of an information asset in terms of its confidentiality, integrity and availability. This can also be described in terms such as "high", "medium" or "low", or better still, in financial terms whenever possible. Company standard information classifications such as "confidential" and "restricted", tend to describe the confidentiality aspect only. Some information may have no confidentiality issues but its availability requirement is high, such as emergency phone numbers. It is the responsibility of the information owner to define its criticality, which can be used to calculate impact and define enforcement policy for security incident response.

The method and system of an embodiment of the invention defines risk as being a component, for example, of the criticality of the information technology system to a business, the threats that the particular system faces, and the vulnerabilities that are within the system. The criticality of the system is defined, for example, in terms of how important the system is to the company, the effect of disruption of the system, the result of unauthorized persons seeing the information on the system, the effect of unauthorized changes in the information on the system, and the effect of unavailability of the information on the system when it should be available. An aspect of the invention determines how critical a particular system is by asking those questions. The present invention defines the different types of threats to the system in terms, for example, of the amount of resources that threat agents can bring to bear, such as the level of their technical knowledge and ability; the number of threat agents; and what financial resources are available to them in attacking the system.

An aspect of the present invention defines vulnerability in terms, for example, of privileges and access. When someone exploits a vulnerability, it results in their having privileges in addition to those which they would normally have. A normal user may be able to access certain data from a computer, but if that person were to exploit a vulnerability, he or she might have additional control, for example, to see and/or delete other persons' data that he or she would not otherwise have. Thus, vulnerability has a component of which privilege is a major part. The other component of vulnerability is defined according to this aspect in terms of the access that is necessary for a person to have in order to exploit the vulnerability, such as whether the vulnerability presents itself to the external environment, for example, via a network or a keyboard or mouse input, or requires access for the attacking entity to the physical box itself by its floppy disc drive.

Based upon those definitions, an aspect of the invention involves putting numbers around the criticality, threats, and vulnerabilities for a particular information technology system that, when multiplied together, gives a total number that is relative to the likelihood of an attack on the system taking place. For example, if a particular vulnerability gives an attacking entity super privileges on a machine (i.e., the privilege side), and if that vulnerability were present across the network to everyone in the world (i.e., the access side), and if the required amount of resources to exploit the vulnerability were the same as a casual user (i.e., the threat), and the actual system under discussion is very critical to the company, there is an extremely high risk. In the foregoing example, the likelihood, which is the threat from the vulnerability, is very high; the criticality is very high; so the risk is very high. On the other hand, if the likelihood of an attack were high, but the system itself were valueless, the risk is very low. Likewise, if the system has a very high value, but the likelihood of an attack is extremely small, then again the risk is low. Thus, there is a relationship between these different factors, and by assigning relative numbers to these factors, an embodiment of the present invention provides a total value of risk per vulnerability.

The quantitative risk assessment model for an embodiment of the invention can be represented by the formula:

$$\text{Risk}(t) = \text{Impact}(t) * P[\text{Threat}(t) * \text{Vulnerability}(t)]$$

The notion of "Risk" represented in this formula simply describes who can cause what kind of damage to information systems and to what extent. Risk on the left side of the formula denotes the information risk component of business risk. "Impact" ultimately represents financial damage caused by the security risk being realized. This can be determined by the financial loss should an attribute of the data manipulated by or stored within a system be changed. In other words, what would be the material loss should an unauthorized change occur to the confidentiality, integrity or availability of the data? In addition, reputation risk (a change in the integrity of the organization's brand) and other indirect financial loss should be included in the calculation or estimation of "Impact". "P" is the probability or the likelihood of exploitation represented by "Threat*Vulnerability". In an embodiment of the invention, business managers determine Impact. The Threat agents that a product or system faces are determined jointly by the business manager and the information security officers, and the Vulnerability is determined by information security officers and technicians.

An aspect of the invention also involves aggregating all these risks on a particular system to determine a total value of risk. The risk of one system can then be compared, for example, with that of another system. An important feature of the method and system of the present invention is the use of strict definitions of what the vulnerability and threats are, assigning relative numbers to each, and using those numbers to come up with a quantitative value. In the present invention, expert knowledge is applied to finding vulnerabilities, and numbers are assigned, so that comparisons and aggregation can be performed. Finding the vulnerability on a particular system requires the expert to have knowledge of that system itself, such as through previous experiences, through knowledge gained through literature, or through actual testing. The expert then has the ability to determine, for example, what additional privileges the vulnerability gives to an entity, how the vulnerability presents itself to the outside world, and perhaps more importantly, the level of resources that would be required to exploit the vulnerability or how difficult is it for someone to exploit the vulnerability. In an embodiment of the present invention, the expert applies his or her knowledge and determines, for example, the level of resources required, the type of vulnerability, and hence the numbers that apply to each.

The method and system of the present invention can be used in the context of a comparison of risks or as a stand-alone evaluation of a separate risk. As an example of the process of risk assessment for an embodiment of the invention, assume there is a website connected to the Internet. An individual conducts what is known as an ethical hack or a penetration test against that system and possibly manages to break into that system. In order to do that, the individual would have had to exploit a vulnerability, so he or she would probably have had Internet access and would have gained the privilege of another user or a security administrator or all of the super users. That is the vulnerability. In assigning a number to that, an aspect of the invention utilizes part of the expert knowledge that is brought to bear. For example, a number of different examples of previous vulnerabilities that have been discovered are examined. This aspect involves a process of asking, for example, how great a vulnerability is this one compared to the others and whether the numbers assigned actually conform to one's intuitive belief. In this aspect, case studies are gone through to fine tune the numbers. If it is found that the numbers are correct, for example, for the last ten or fifteen or twenty case studies that were performed, there is a high degree of confidence that new ones coming in should also be correct relative to everything else that has been seen. Once the ethical hacker breaks into the particular system, he or she then has a list of all the vulnerabilities that were found by him or her on the system. The ethical hacker then determines the difficulty associated with exploiting those vulnerabilities.

The method and system for an embodiment of the present invention can be implemented using, for example, an algorithm and/or a set of tables. Once the numbers are identified, the algorithm is relatively straight-forward, and when the levels of privilege, access, and threat are defined, the algorithm yields, for example, a likelihood of attack. Further, the method and system for an embodiment of the present invention can be implemented utilizing computer hardware and software. The model for an embodiment of the invention assigns a score, for example, from 1 to 10 for each threat, access, and privilege, respectively, to facilitate a calculation. To produce a probability range of 0 to 1, the total number calculated for the product of the Threat and Vulnerability is therefore divided by 1000. FIG. 1 is a table that illustrates an example of suggested scores for threat 102, access 104, and privilege 106 for an embodiment of the invention. The higher the score, the greater is the likelihood and hence risk. Threat 102 is introduced and performed by individuals or organizations that wish to exploit the vulnerability 108. A vulnerability 108 that can be exploited by causal users is considered more likely to result in an incident than one requiring the resources of a hacker, because special skills or pre-requisites are not required. Further, the number of casual users is much greater than the number of hackers. Likewise, the possibility for disgruntled employees or competitors to exploit a vulnerability 108 is typically less than that of normal users and hackers. When a vulnerability 108 is capable of being exploited directly from the Internet or a wide area network (WAN), the risk is much higher than an exploitation that requires terminal (keyboard) or physical (floppy or CD-drive) access. When an unauthorized access occurs, the privilege that is acquired also determines the risk level. For example, super-user privilege allows unlimited access to the entire system, so that the subsequent risk is the highest. On the other hand, security or system administrator and normal users privilege contribute less risk as a result of more limited access to sensitive data.

It is to be noted that in the information technology industry, vulnerabilities typically start off by being discovered in universities or government departments and are extremely difficult to exploit. However, over time, information technology industry vulnerabilities become easier to exploit, as people, rather than exploiting them by hand, begin to write software programs that allow other people to exploit those vulnerabilities. Thus, the situation changes with time for each vulnerability as it become easier and easier to exploit. An aspect of the present invention allows for the fact that information technology vulnerabilities change with time, for example, by defining each vulnerability itself and then defining the threat level, which can change over time and hence cause a change on the actual risk. In this aspect, the ethical hackers produce a list of vulnerabilities and the ease of exploitation, from which the likelihood of the system being compromised can be determined. However, through time, each vulnerability becomes easier and easier to exploit, so there is a change in the threat, and when this change is included in the algorithm, the numbers change. Therefore, it can be seen that the level of risk actually increases with time, if nothing is done about the vulnerabilities that exist.

Note that these variables can be time-dependent even if their current snapshots are taken for assessment. An unpublished vulnerability can be available only to law enforcement agencies or researchers. When it becomes public, it is fair to assume that, with time, sophisticated hackers could exploit the vulnerability followed sometime later by 'kiddy scriptors' or even casual users, when a scripted exploitation becomes available. Thus, the level of threat that can exploit a given vulnerability usually increases with time. Adding mitigation processes or technologies usually increases the level of resource required to exploit the vulnerability. Therefore, the threat and hence the risk is reduced.

The effectiveness of the model for an embodiment of the present invention can be illustrated by examples of its use to check against various potentially high-risk security issues for web-based Internet applications. One such issue is the absence of checking invalid user input. Invalid user input, if not checked by the web server, is a common method used to exploit cross-site scripting (CSS) or buffer-overflow vulnerability. CSS can result in the interception of a user's ID/password, while buffer overflow can expose super-user privilege. Hackers or certain casual users may be able to exploit this weakness to acquire individual privilege for CSS or super-user privilege for buffer overflow. As a result, referring to the table of FIG. 1, threat 102 has an assigned score of 9.5 for "kiddy scriptors", access 104 has an assigned score of 10 for an Internet application, and privilege 106 has an assigned score of 5 for CSS (normal users) or an assigned score of 10 for buffer overflow (super-user).

Thus, computation of the CSS security risk level involves multiplying 9.5 (the assigned score for threat 102) times 10 (the assigned score for access 104) times 5 (the assigned score for privilege 106) to yield a CSS security risk level of 475. Likewise, computation of the buffer overflow security risk level involves multiplying 9.5 (the assigned score for threat 102) times 10 (the assigned score for access 104) times 10 (the assigned score for privilege 106) to yield a buffer overflow security risk level of 950. Assume the business decides that impact 110 equals $12M. Thus, for CSS, Risk is computed as $12M times 475 (the CSS security risk level) divided by 1000 equals a total Risk value of $5.7M, and for buffer overflow, Risk is computed as $12M times 950 (the buffer overflow security risk level) divided by 1000 equals a total Risk value of $11.4M.

Another such issue is the ability to read audit logs. Audit logs in the web server can be subject to unauthorized access. Hackers can exploit this weakness to acquire security auditor's privilege. Referring again to the table of FIG. 1, threat 102 has an assigned score of 9 for hackers, access 104 has an assigned score of 10 for an Internet application, and privilege 106 has an assigned score of 7 for security auditor. Therefore, computation of the audit logs security risk level involves multiplying 9 (the assigned score for threat 102) times 10 (the assigned score for access 104) times 7 (the assigned score for privilege 106) to yield an audit logs security risk level of 630. Assume the business says that impact 110 equals $20M. Thus, for audit logs, Risk is computed as $20M times 630 (the audit logs security risk level) divided by 1000 equals a total Risk value of $12.6M In an embodiment of the invention, the numbers calculated from threat and vulnerability can represent incident probabilities in a relative scale. In real applications, security incident probabilities are not capable of being labeled with such fine granularity. Defining thresholds to map the model of the present invention to a simple High-Medium-Low risk model that is commonly used by businesses and vendors is a challenge. An approach for an embodiment of the invention is to take existing security issues that have previously been labeled high, medium, or low to fine-tune the thresholds. For example, using several iterations, it may be concluded that thresholds for high and medium issues fall into certain numerical categories, such as 600 and 450, respectively. Further, the thresholds can be re-applied to check against the definitions of risk labeling by all ethical hacking vendors to ensure that they are consistent.

Another application of the model for an embodiment of the invention is to define an enforcement policy to remedy security issues when they exceed certain thresholds based on the criticality of systems with respect to the data that they manipulate or store. For example, tiers can be defined for live applications and the time frame for a required remedy when the security risk level or likelihood of a security event called "the likelihood of exploitation" exceeds a certain threshold. FIG. 2 is a table that illustrates an example of security incident response time based on exploitation likelihood and tiers for an embodiment of the present invention. The definition of "tiers" can incorporate "criticality" into the calculation. Referring to FIG. 2, "T1" 202 represents, for example, Internet web-based applications, transaction processors, infrastructures and the like. "T2" 204 covers, for example, user databases and application servers in data centers. "T2" 204 includes, for example, PC administration and desktops/laptops. "Tc" 208 is a tier that is, for example, outside direct control. However, awareness and potential fixes can be provided, if available, to customers, if security issues can compromise customer data and directly or indirectly cause damage to the corporation. Security issues for Tc 208 may or may not be caused by web servers. Therefore, response time for Tc 208 can be different from that of T1 202.

Referring further to FIG. 2, the issue of absence of checking invalid user input may require remediation within 48 hours for the buffer-overflow vulnerability and within 96 hours for the CSS vulnerability, since it is an Internet web application. Remediation may either reduce the security risk or eliminate the security risk entirely. For example, checking the validity of user input data would eliminate the security risk for the issue of absence of checking of invalid user input. If an application uses, for example, 40-bit RC4 to encrypt sensitive data, the risk could be lowered, but not completely removed, if 112-bit 3DES is used instead. That is because it is still theoretically possible to break the encryption, but the amount of resource required to do so is considerably greater.

A further application for the model for an embodiment of the invention is to aggregate the security risk for all security issues and define a high-water-mark to confine the total number to this limit. It is possible that a business practice may be to ignore all low risk issues. However, when a number of low-risk issues are aggregated, the cumulative risk is greater and so may deserve attention. As a result, the model of the present invention can be used to set the upper limit for all security issues associated with an application or information system within an enterprise. For example, an enterprise may set a policy so that the aggregated security risk for all security issues must not exceed a certain numerical level, such as 3000. Under this policy and the enforcement policy described above, all individual security issues with their security risk exceeding a predetermined numerical level, such as 250, would require remedy according to the enforcement policy listed in the table of FIG. 2. After that, the aggregation of security issues including remedied issues with a residual risk less than or equivalent, for example, to 250 must not exceed, for example, 3000. Otherwise, a remedy plan should be proposed to further lower the number, for example, below 3000.

Figure 3:
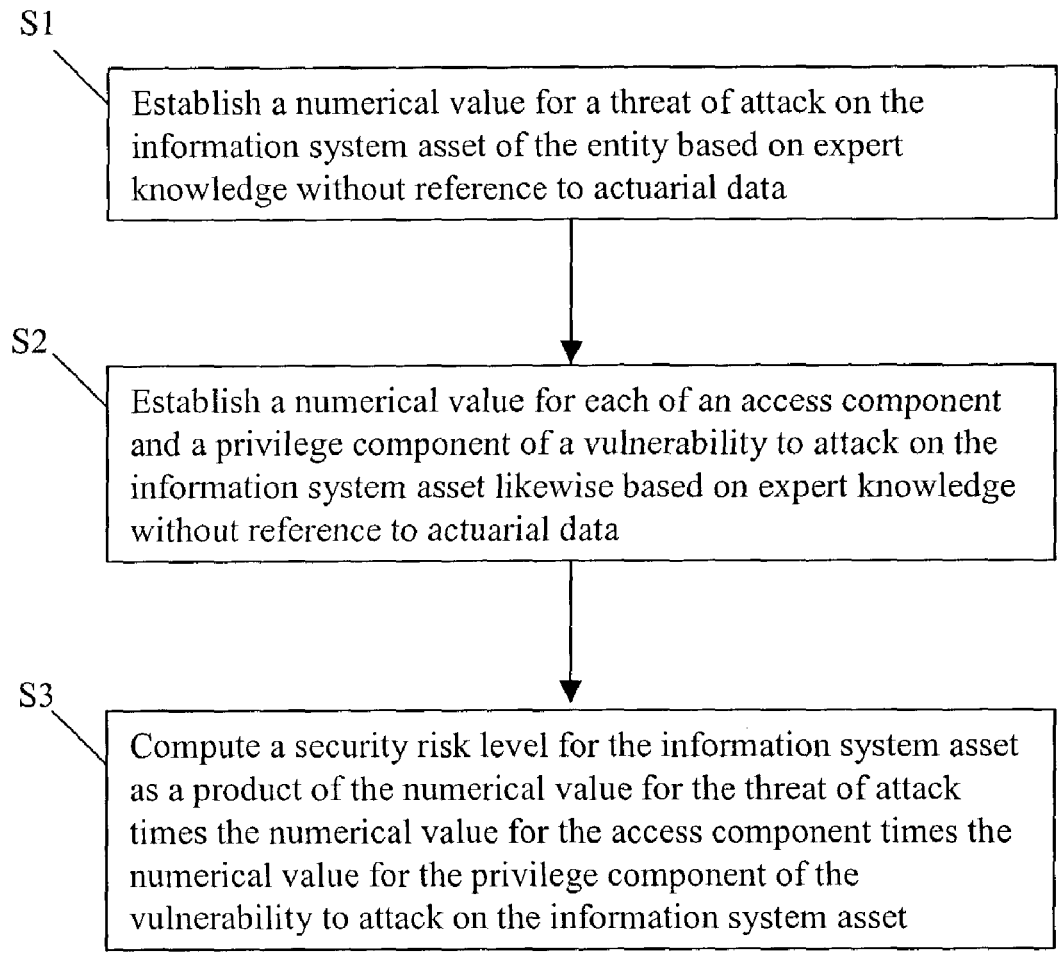
FIG. 3 is a flow chart that illustrates an example of the process of quantifying a risk exposure of at least one information system asset of an entity using the one-dimensional quantitative risk assessment model for an embodiment of the present invention.

FIG. 3 is a flow chart that illustrates an example of the process of quantifying a risk exposure of at least one information system asset of an entity using the one-dimensional quantitative risk assessment model for an embodiment of the present invention. Referring to FIG. 3, at S1, a numerical value for a threat of attack on the information system asset of the entity is established based on expert knowledge without reference to actuarial data. At S2, a numerical value for each of an access component and a privilege component of a vulnerability to attack on the information system asset is established likewise based on expert knowledge without reference to actuarial data. At S3, a security risk level for the information system asset is computed as a product of the numerical value for the threat of attack times the numerical value for the access component times the numerical value for the privilege component of the vulnerability to attack on the information system asset.

FIG. 4 is a table that illustrates examples of uses for the security risk level quantified for the information system asset according to an embodiment of the present invention. Referring to FIG. 4, for example, the security risk level calculated for the information system asset can be compared to a security risk level calculated for another information system asset, or a security risk level threshold limit can be pre-established, and if the security risk level calculated for the information system asset exceeds the pre-established security risk level threshold limit, remediation is initiated. Further, a time limit for initiating remediation can be pre-established, and if the security risk level calculated for the information system asset exceeds the pre-established security risk level threshold limit, remediation is initiated within the pre-established time limit. In addition, a financial value of a security risk to the entity from attack on the information system asset can be calculated based on a pre-established financial impact on the entity from attack on the information system asset and the security risk level calculated for the information system.

Figure 5:
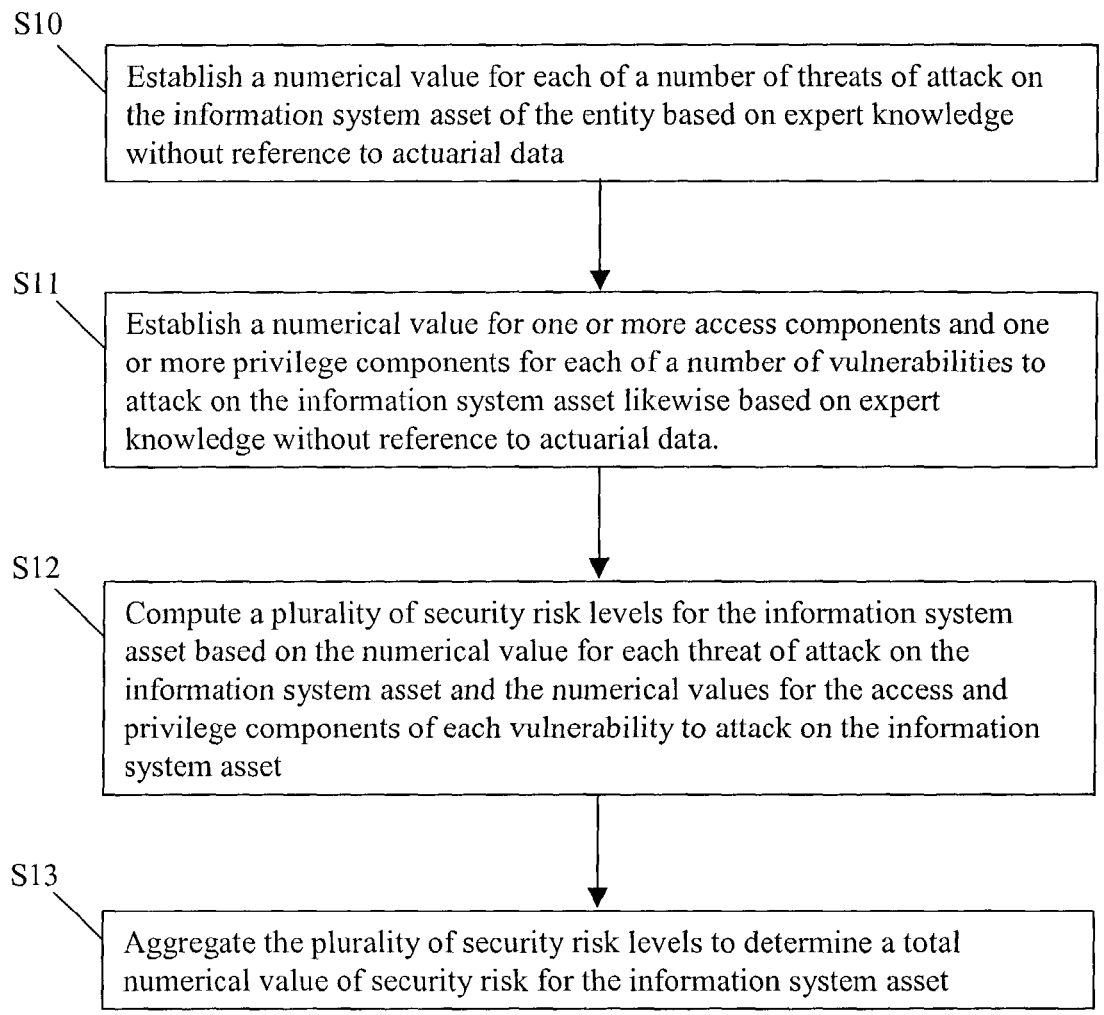
FIG. 5 is a flow chart that illustrates an example of the process of quantifying an aggregate risk exposure of at least one information system asset of an entity using the one-dimensional quantitative risk assessment model for an embodiment of the present invention.

FIG. 5 is a flow chart that illustrates an example of the process of quantifying an aggregate risk exposure of at least one information system asset of an entity using the one-dimensional quantitative risk assessment model for an embodiment of the present invention. Referring to FIG. 5, at S10, a numerical value is established for each of a number of threats of attack on the information system asset of the entity based on expert knowledge without reference to actuarial data. At S11, a numerical value for one or more access components and one or more privilege components for each of a plurality of vulnerabilities to attack on the information system asset is likewise established also based on expert knowledge without reference to actuarial data. At S12, a plurality of security risk levels are computed for the information system asset based on the numerical value for each threat of attack on the information system asset and the numerical values for the access and privilege components of each vulnerability to attack on the information system asset. At S12, the plurality of security risk levels is aggregated to determine a total numerical value of security risk for the information system asset.

FIG. 6 is a table that illustrates examples of uses for the total numerical value of security risk quantified for the information system asset according to an embodiment of the present invention. For example, the total numerical value of security risk for the information system asset can be compared to a total numerical value of security risk calculated for another information system asset. Further, an aggregate security risk threshold limit can be pre-established, and if the total numerical value of security risk calculated for the information system asset exceeds the pre-established numerical value for an aggregate security risk threshold limit, remediation is initiated.

An aspect of the present invention provides, for example, a one-off assessment, which also plays an important part of risk management itself. This is used, for example, in conjunction with an asset inventory database so that risks and the different vulnerabilities can be assigned on a system-by-system basis. As those vulnerabilities become easier to exploit, the numbers can be put back into the equation to reassess the total level of risk. A benefit of doing this within an organization, such as a financial institution, is that such an organization must begin measuring its operational risks and show regulators that it understands what the operational risks are and that those risks are being controlled. Security risks are a product of operational risks. The method and system for an embodiment of the present invention provides a mechanism for managing those operational risks and assuring that those issues are being addressed in a timely and cost-effective manner. The method and system for an embodiment of the present invention can also be used, for example, by insurance organizations that wish to look at the risks of other systems, so that they can assign costs to the insurance for a particular system. For example, a system with a risk level of 20,000 is twice as likely to be compromised as a system with a risk level of 10,000, and different values can be assigned for the insurance costs. Essentially, an embodiment of the present invention provides a quantitative rather than a qualitative mechanism and uses security experts to arrive at the numbers.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for assessing and quantifying a risk exposure of at least one information system asset of an entity using a one-dimensional quantitative risk assessment model, comprising:

establishing a numerical value for at least one threat of attack on the information system asset of the entity based on expert knowledge without reference to actuarial data;

establishing a numerical value for each of at least one access component and at least one privilege component of at least one vulnerability to attack on the information system asset likewise based on expert knowledge without reference to actuarial data; and computing a security risk level for the information system asset based on the numerical value for the threat of attack on the information system asset and the numerical values for the access and privilege components of the vulnerability to attack on the information system asset, wherein computing the security risk level further comprises:

calculating the security risk level for the information system asset as a product of the numerical value of the threat of attack on the information system asset and the numerical values for the access and privilege components of the vulnerability to attack on the information system asset, and establishing a monetary value of a financial impact on the entity of attack on the information system asset by a self-assessment of the criticality of confidentiality, integrity and availability of the information system asset to the entity and calculating a financial value of a security risk to the entity from attack on the information system asset based on the financial impact on the entity and the security risk level calculated for the information system, wherein computing the security risk level further comprises establishing a numerical value for a security risk level threshold limit for the information system asset and initiating remediation if the security risk level calculated for the information system asset exceeds the security risk level threshold limit, and wherein initiating remediation further comprises establishing a time limit for initiating remediation and initiating remediation within the time limit if the security risk level calculated for the information system asset exceeds the security risk level threshold limit.

2. The method of claim 1, wherein establishing the numerical value for the threat of attack further comprises establishing the numerical value for a potential for attack on the information system asset by a threat agent.

3. The method of claim 2, wherein establishing the numerical value for the potential for attack further comprises establishing the numerical value for a combination of motivation and ability of the threat agent for attack on the information system asset.

4. The method of claim 2, wherein establishing the numerical value for the potential for attack further comprises identifying the threat agent by at least one of a business manager and an information security officer for the entity.

5. The method of claim 4, wherein identifying the threat agent further comprises identifying the threat agent from a group consisting at least in part of a casual user, a kiddy scriptor, a hacker, a disgruntled employee, a legitimate consumer, a competitor, a political activist, an agent of organized crime, a law enforcement agent, and a government agent.

6. The method of claim 1, wherein establishing the numerical value for the access component of the vulnerability to attack further comprises identifying at least one mode of access that is required for attack on the information system asset by a threat agent.

7. The method of claim 6, wherein identifying the mode of access further comprises identifying at least one method of attack on the information system asset that is available to the threat agent.

8. The method of claim 6, wherein identifying the mode of access further comprises identifying the mode of access by at least one of an information security officer and a technician for the entity.

9. The method of claim 6, wherein identifying the mode of access further comprises identifying at least one mode of access from a group consisting at least in part of a wide area network access, a global network access, a wireless access, a proprietary network access, a packet switched network access, a terminal access, and a physical access.

10. The method of claim 1, wherein establishing the numerical value for the privilege component of the vulnerability to attack further comprises identifying at least one unauthorized privilege that can be acquired by a threat agent from attack on the information system asset.

11. The method of claim 10, wherein identifying the unauthorized privilege further comprises identifying the unauthorized privilege by at least one of an information security officer and a technician for the entity.

12. The method of claim 10, wherein identifying the unauthorized privilege further comprises identifying the unauthorized privilege from a group consisting at least in part of a super user privilege, a security administrator privilege, a super user read privilege, a security auditor privilege, a normal user privilege, and a guest privilege.

13. The method of claim 1, wherein computing the security risk level further comprises comparing the security risk level calculated for the information system asset to a security risk level calculated for a second information system asset.

14. The method of claim 1, wherein establishing the monetary value of the financial impact on the entity further comprises establishing the monetary value of the financial impact at least in part by a business manager for the entity.

15. A method for assessing and quantifying an aggregate risk exposure of at least one information system asset of an entity using a one-dimensional quantitative risk assessment model, comprising:
   establishing a numerical value for each of a plurality of threats of attack on the information system asset of the entity based on expert knowledge without reference to actuarial data;
   establishing a numerical value for at least one access component and at least one privilege component of each of a plurality of vulnerabilities to attack on the information system asset likewise based on expert knowledge without reference to actuarial data;
   computing a plurality of security risk levels for the information system asset based on the numerical value for each threat of attack on the information system asset and the numerical values for the access and privilege components of each vulnerability to attack on the information system asset, wherein computing the security risk level further comprises:
   calculating the plurality of security risk levels for the information system asset as a product of the numerical value of each threat of attack on the information system asset and the numerical values for the access and privilege components of each vulnerability to attack on the information system asset, and
   establishing a monetary value of a financial impact on the entity of attack on the information system asset by a self-assessment of the criticality of confidentiality, integrity and availability of the information system asset to the entity and calculating a financial value of a security risk to the entity from attack on the information system asset based on the financial impact on the entity and the security risk level calculated for the information system; and
   aggregating the plurality of security risk levels to determine a total numerical value of security risk for the information system asset,
   wherein computing the security risk level further comprises establishing a value for a security risk level threshold limit for the information system asset and initiating remediation if the security risk level calculated for the information system asset exceeds the security risk level threshold limit, and
   wherein initiating remediation further comprises establishing a time limit for initiating remediation and initiating remediation within the time limit if the security risk level calculated for the information system asset exceeds the security risk level threshold limit.

16. The method of claim 15, wherein aggregating the plurality of security risk levels further comprises comparing the total numerical value of security risk for the information system asset to a total numerical value of security risk calculated for a second information system asset.

17. The method of claim 15, wherein aggregating the plurality of security risk levels further comprises establishing a numerical value for an aggregate security risk threshold limit for the information system asset and initiating remediation if the total numerical value of security risk calculated for the information system asset exceeds the aggregate security risk threshold limit.

18. A system for assessing and quantifying a risk exposure of at least one information system asset of an entity using a one-dimensional quantitative risk assessment model, comprising:
   means for establishing a numerical value for at least one threat of attack on the information system asset of the entity based on expert knowledge without reference to actuarial data;
   means for establishing a numerical value for each of at least one access component and at least one privilege component of at least one vulnerability to attack on the information system asset likewise based on expert knowledge without reference to actuarial data; and
   means for computing a security risk level for the information system asset based on the numerical value for the threat of attack on the information system asset and the numerical values for the access and privilege components of the vulnerability to attack on the information system asset, wherein the means for computing the security risk level further comprises:
   means for calculating the security risk level for the information system asset as a product of the numerical value of the threat of attack on the information system asset and the numerical values for the access and privilege components of the vulnerability to attack on the information system asset, and means for establishing a monetary value of a financial impact on the entity of attack on the information system asset by a self-assessment of the criticality of confidentiality, integrity and availability of the information system asset to the entity and calculating a financial value of a security risk to the entity from attack on the information system asset based on the financial impact on the entity and the security risk level calculated for the information system;

wherein the means for computing the security risk level further comprises means for establishing a numerical value for a security risk level threshold limit for the information system asset and means for initiating remediation if the security risk level calculated for the information system asset exceeds the security risk level threshold limit, and wherein the means for initiating remediation further comprises means for establishing a time limit for initiating remediation and initiating remediation within the time limit if the security risk level calculated for the information system asset exceeds the security risk level threshold limit.

19. A system for assessing and quantifying an aggregate risk exposure of at least one information system asset of an entity using a one-dimensional quantitative risk assessment model, comprising:

means for establishing a numerical value for each of a plurality of threats of attack on the information system asset of the entity based on expert knowledge without reference to actuarial data;

means for establishing a numerical value for at least one access component and at least one privilege component of each of a plurality of vulnerabilities to attack on the information system asset likewise based on expert knowledge without reference to actuarial data;

means for computing a plurality of security risk levels for the information system asset based on the numerical value for each threat of attack on the information system asset and the numerical values for the access and privilege components of each vulnerability to attack on the information system asset, wherein the means for computing the security risk level further comprises:

means for calculating the plurality of security risk levels for the information system asset as a product of the numerical value of each threat of attack on the information system asset and the numerical values for the access and privilege components of each vulnerability to attack on the information system asset, and means for establishing a monetary value of a financial impact on the entity of attack on the information system asset by a self-assessment of the criticality of confidentiality, integrity and availability of the information system asset to the entity and calculating a financial value of a security risk to the entity from attack on the information system asset based on the financial impact on the entity and the security risk level calculated for the information system; and means for aggregating the plurality of security risk levels to determine a total numerical value of security risk for the information system asset, wherein the means for computing the security risk level further comprises means for establishing a numerical value for a security risk level threshold limit for the information system asset and means for initiating remediation if the security risk level calculated for the information system asset exceeds the security risk level threshold limit, and wherein the means for initiating remediation further comprises means for establishing a time limit for initiating remediation and initiating remediation within the time limit if the security risk level calculated for the information system asset exceeds the security risk level threshold limit.

* * * * *